(12) United States Patent
Singhal et al.

(10) Patent No.: US 9,003,155 B2
(45) Date of Patent: *Apr. 7, 2015

(54) METHOD AND SYSTEM FOR MANAGING STORAGE UNITS

(71) Applicant: NetApp, Inc., Sunnyvale, CA (US)

(72) Inventors: Satish Singhal, Sunnyvale, CA (US); Abhishek Naidu, Sunnyvale, CA (US); Ameet Pyati, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,106

(22) Filed: Jun. 7, 2013

(65) Prior Publication Data

US 2013/0275711 A1 Oct. 17, 2013

Related U.S. Application Data

(63) Continuation of application No. 12/978,212, filed on Dec. 23, 2010, now Pat. No. 8,473,708.

(51) Int. Cl.
*G06F 12/08* (2006.01)
*G06F 12/02* (2006.01)
*G06F 3/06* (2006.01)

(52) U.S. Cl.
CPC ........ *G06F 12/0292* (2013.01); *G06F 12/0223* (2013.01); *G06F 12/02* (2013.01); *G06F 3/0619* (2013.01); *G06F 3/0644* (2013.01); *G06F 3/0652* (2013.01); *G06F 3/0686* (2013.01)

(58) Field of Classification Search
CPC .......... G06F 12/0223; G06F 12/0292; G06F 3/0608; G06F 3/0641
USPC .................................................. 711/170, 202
See application file for complete search history.

(56) References Cited

U.S. PATENT DOCUMENTS

| | | | |
|---|---|---|---|
| 6,701,420 B1 * | 3/2004 | Hamilton et al. | 711/170 |
| 8,473,708 B1 * | 6/2013 | Singhal et al. | 711/170 |
| 2006/0282636 A1 | 12/2006 | Yamamoto et al. | |
| 2008/0046646 A1 | 2/2008 | Tamura et al. | |
| 2010/0161585 A1 * | 6/2010 | Jin et al. | 707/707 |
| 2010/0262760 A1 | 10/2010 | Swing et al. | |
| 2012/0131301 A1 | 5/2012 | Maeda et al. | |
| 2012/0166725 A1 * | 6/2012 | Soran et al. | 711/114 |

* cited by examiner

*Primary Examiner* — Than Nguyen
(74) *Attorney, Agent, or Firm* — Klein, O'Neill & Singh, LLP

(57) ABSTRACT

Method and system for managing storage units are provided. A free space module scans a storage unit data structure and a reference data structure to generate an intermediate data structure that identifies storage units that are not referenced by any storage unit client. A lookup module is initiated and the storage unit clients are notified that all new references to any storage unit should be verified with the lookup module. The free space module then verifies if any of the storage units in the intermediate data structure have been referenced since the intermediate data structure was created. Any referenced storage units are removed from the intermediate data structure and a data structure identifying unreferenced storage units is generated. The data structure is then used to allocate the identified storage units.

19 Claims, 9 Drawing Sheets

| Storage Unit Data Structure 50 | | Reference Log 1 | | Reference Log N | |
|---|---|---|---|---|---|
| Identifier | Reference Count | Identifier | Operation Type | Identifier | Operation Type |
| x1 | 1 | x2 | Reference | x1 | UnReference |
| x2 | 2 | x3 | UnReference | x2 | Reference |
| x3 | 1 | x6 | Reference | x4 | UnReference |
| x4 | 2 | x8 | UnReference | x7 | Reference |
| x5 | 3 | x10 | UnReference | x8 | UnReference |
| x8 | 2 | | | x9 | UnReference |
| x9 | 1 | | | | |
| x10 | 1 | | | | |

| Update Storage Unit Data Structure | | 1st Free Storage Unit Log 62a | | | |
|---|---|---|---|---|---|
| Identifier | Reference Count | Identifier | Reference Count | | |
| x2 | 4 | x1 | 0 | | |
| x4 | 1 | x3 | 0 | | |
| x5 | 3 | x8 | 0 | | |
| x6 | 1 | x9 | 0 | | |
| x7 | 1 | x10 | 0 | | |

| 1st Free Storage Unit Log 62a | | Client 1 in-use log 67a | | Client N in-use log 67n | |
|---|---|---|---|---|---|
| Identifier | Reference Count | Identifier | | Identifier | |
| x1 | 0 | x2 | | x2 | |
| x3 | 0 | x4 | | x5 | |
| x8 | 0 | x5 | | x7 | |
| x9 | 0 | x6 | | x10 | |
| x10 | 0 | | | | |

FIG. 1D-1

METHOD AND SYSTEM FOR MANAGING STORAGE UNITS

CROSS-REFERENCE TO RELATED APPLICATION

This patent application claims priority of and is a continuation of U.S. patent application Ser. No. 12/978,212 filed on Dec. 23, 2010, and now U.S. Pat. No. 8,473,708, the disclosure of which is incorporated herein by reference in its entirety.

TECHNICAL FIELD

The present disclosure relates to storage systems.

BACKGROUND

A storage system typically comprises one or more storage devices where information may be entered, and from which information may be obtained, as desired. The storage system typically includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a user or host computer.

A storage system typically stores information at a primary storage array, which may then be replicated and archived at a secondary storage array for disaster recovery or any other reason. The replication process is commonly referred to as a "backup" operation. The storage devices are typically disk drives organized as a disk array, wherein the term "disk" commonly describes a self-contained rotating magnetic media storage device. Information may also be stored on tape drives, conventional magnetic disks, optical disks such as CD-ROM or DVD based storage, flash memory storage device or any other type of non-volatile storage devices suitable for storing data.

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID).

A tape drive is a data storage device that reads and writes data stored on a magnetic tape and is often used for backing up data stored at other types of storage. A tape library is a storage device that may contain tape drives, slots to hold tape cartridges and an automated method for physically moving tapes within the device.

Unlike hard drives that allow random-access to data, tape drives only allow for sequential-access of data. A tape drive spends a considerable amount of time winding tape between reels to read a particular piece of data. As a result, tape drives have very slow average seek times.

Despite its limitations various backup systems and applications continue to backup data at tape libraries because they can store large amounts of data. One option, called a virtual tape library (VTL) has been used to take advantage of the existing tape infrastructure while data is replicated on disk drives or other media. VTL is a data storage virtualization technology typically used for archival and backup purposes. In generic terms, VTL presents a storage component (such as disk) as tapes available for use with tape drives. In other words, VTL presents a non-tape storage device that appears to be a tape library to a backup application, but actually stores data by other means. A VTL can be configured as a temporary storage location before data is actually sent to real tapes or it can be the final storage location itself. VTL technology is typically implemented in a VTL appliance that presents a plurality of virtual tape volumes (VTVs) (also referred to as a virtual storage volumes (VSVs)) to backup applications and other user systems. The VSVs use a plurality of storage units within a logical space for storing information at the physical storage space of a storage device.

The term logical space means a virtual storage space that is divided by the plurality of storage units. The storage units are mapped to the physical storage space at the storage device. The VSVs store data to the storage units of the logical space and are typically unaware of the physical storage space layout at the storage device.

Logic for the VTL appliance typically manages the plurality of storage units within the logical space. To manage the storage units, logic for the VTL occasionally determines which storage units in the logical space are not being used at any given time such that they can be allocated to VSVs. If each VSV were to exclusively use a dedicated storage unit, it would be simpler to manage the logical space. However, multiple VSVs may reference the same storage unit for storing information, which makes the process of determining unused storage unit complex. The process is further complicated because VSVs may seek to use a storage unit while the storage unit may be in the process of being released to a pool of available storage units. Continuous efforts are being made to improve the overall process of managing the storage units in general and to improve the process by which storage units are allocated, in particular.

SUMMARY

In one embodiment, a method and system for managing storage units are provided. The storage units are presented to a plurality of virtual storage volumes to store information at a storage device. The virtual storage modules may be referred to as storage unit clients. A processor executable free space module scans a storage unit data structure and a reference data structure to generate an intermediate free storage unit data structure that identifies storage units that are not referenced by any storage unit client.

The free space module verifies if any of the storage units in the intermediate data structure have been referenced since the intermediate data structure was created. Any referenced storage units are removed from the intermediate data structure and a data structure identifying unreferenced storage units is generated. The data structure is then used to allocate the storage units identified therein. In another embodiment, a machine implemented method is provided. The method includes generating an intermediate data structure identifying storage units that are not referenced by any storage unit client from among a plurality of storage unit clients. The plurality of storage unit clients are virtual tape volumes presented to a computing system for storing information on a storage device and the storage units are included in a virtual storage space between the storage device and the plurality of storage unit clients.

The method further includes providing a live reference data structure identifying any storage unit that is referenced by any storage unit client after the intermediate data structure is generated; and generating a data structure after removing any storage unit identified by the intermediate data structure and included in the live reference data structure.

In yet another embodiment, a machine implemented method is provided. The method includes receiving a request to reference a storage unit for storing information at a storage device; and verifying if the storage unit is included in an intermediate data structure identifying storage units that are not referenced by any storage unit client.

The storage unit is removed from the intermediate data structure if the storage unit is included in the intermediate data structure; and a data structure identifying a plurality of storage units that are not referenced by any storage unit client is generated.

In yet another embodiment, a machine implemented method for allocating storage units among a plurality of storage unit clients for storing information at a storage device is provided. A first data structure is generated for identifying a set of storage units that are not referenced by any storage unit client. The plurality of storage unit clients are virtual storage volumes presented to a computing system for storing the information and the storage units are included in a virtual storage space between the storage device and the plurality of storage unit clients.

The method further includes generating a second data structure after verifying that the storage units identified by the first data structure are not referenced by any storage unit client. Any storage unit that is referenced since the first data structure is generated is removed from the second data structure. A third data structure is generated for identifying storage units that are not referenced by any storage unit client.

The embodiments disclosed herein have numerous advantages. For example, the systems and processes generate a data structure identifying storage units that can be allocated. The data structure is verified at different stages to ensure that any storage unit in the data structure is not being used by any virtual storage volume. Because storage units are allocated accurately, one can rely on the allocation for safely storing information.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a method and system for managing storage units within a logical space are provided. A processor executable free space module scans a storage unit data structure and a reference data structure to generate an intermediate free storage unit data structure that identifies storage units that are not referenced by any storage unit client. A lookup module is initiated and access to storage unit clients that want to reference a storage unit is restricted. The storage unit clients are notified that any new reference to any storage unit is to be verified with the lookup module.

The free space module then verifies if any of the storage units in the intermediate data structure have been referenced since the intermediate data structure was created. Any referenced storage units are removed from the intermediate data structure and a data structure identifying unreferenced storage units is created. The data structure is then used to allocate the storage units identified therein.

Figure 1A:
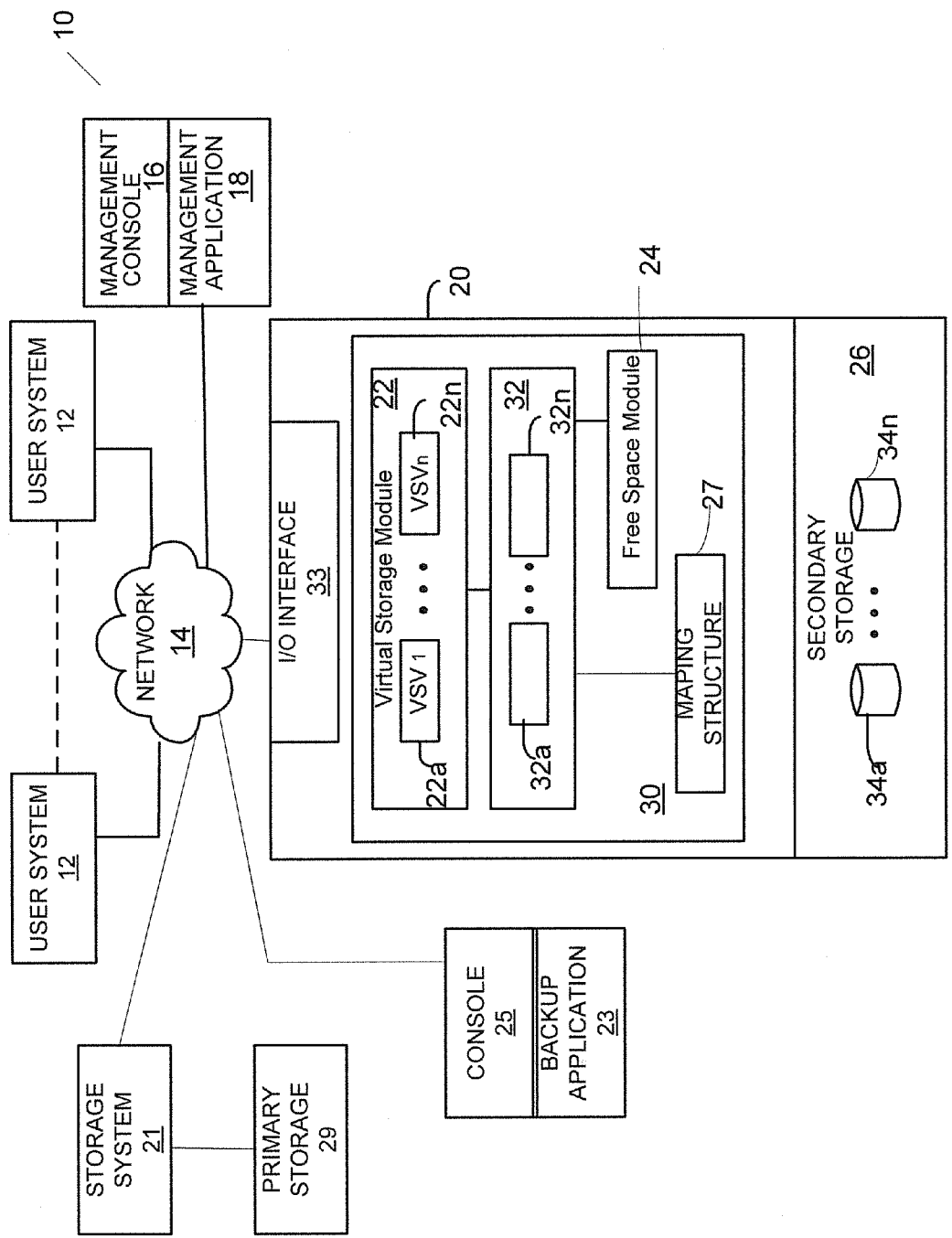
FIG. 1A shows a block diagram of a system using the embodiments disclosed herein.

System:

FIG. 1A shows an example of a system 10 for implementing the various embodiments of the present disclosure, as described below. In one embodiment, system 10 includes at least a storage system 21 executing a storage operating system (not shown) for reading and writing information, to and from a primary storage 29. The primary storage 29 may include a plurality of storage devices (not shown) that may be, for example, tape drives, conventional magnetic disks, optical disks such as CD-ROM or DVD based storage, magneto-optical (MO) storage, flash memory storage device or any other type of non-volatile storage devices suitable for storing data.

The storage system 21 may be operationally coupled to a plurality of user systems 12 through a network 14. Each user system 12 may be, for example, a conventional personal computer (PC), workstation, or the like. The network 14 may be, for example, a local area network (LAN), a wide area network (WAN), a storage area network (SAN), or any other type of network or a combination of networks.

The user systems 12 typically issue read and write requests for reading and writing information to primary storage 29. The storage system 21 is configured to handle and process such requests.

Also connected to the network 14 is a management console 16 that may store and execute a management application 18 (may also be referred to as a storage management application 18). The management console 16 may be, for example, a conventional PC, a workstation, or the like.

The processor executable, management application 18 may be used by an administrator to manage a pool of storage devices and various components of system 10. The management application 18 includes a graphical user interface (GUI) module (not shown) to generate a GUI (e.g., for use by an administrator. In another embodiment, the management application 18 may provide a command line interface (CLI) for use by an administrator for managing and configuring various components of system 10.

Management application 18 is configured to communicate with storage system 21, user systems 12 and different components of system 10. To obtain such information, communication between the management application 18, user systems 12 and storage system 21 may be accomplished using any of the various conventional communication protocols and/or application programming interfaces (APIs), the details of which are not germane to the technique being introduced here. This communication can be done through the network 14 or it can be via a direct link (not shown).

As an example, system 10 includes a console 25 (or computing system 25) that executes a processor executable, backup application 23 for replicating information from the primary storage 29 to a secondary storage 26, also referred to herein as storage sub-system 26. Although backup application 23 is shown as being executed by a standalone computing system, it may be executed by any computing system, for example, user system 12, storage system 21 or management console 16.

Storage sub-system 26 includes a plurality of mass storage devices 34a-34n for storing information that may be configured to operate in different configurations, for example, RAID configurations. The mass storage devices 34a-34n may be, for example, conventional magnetic disks, optical disks such as CD-ROM or DVD based storage, magneto-optical (MO) storage, flash memory storage device or any other type of non-volatile storage devices suitable for storing data. The examples disclosed herein may reference a storage device as a "disk drive" but the adaptive embodiments disclosed herein are not limited to any particular type of storage media/device.

The storage devices 34a-34n are accessible to a virtualization storage appliance 20 that may also be referred to as a virtual tape library (VTL). Throughout this specification, the term virtualization storage appliance, VTL or just appliance 20 are used interchangeably.

Appliance 20 presents a plurality of virtual storage volumes (VSVs) 22a-22n (may also be referred to as virtual tape volumes (VTVs)) to backup application 23 and to other computing systems. As an example, the VSVs present a non-tape storage device (for example, storage devices 34a-34n) to appear as a tape library to backup application 23, but actually stores data by other means. The VSVs are used by backup application 23 or other applications to store information at storage devices 34a-34n.

It is noteworthy that the embodiments disclosed herein are not limited to VTL or tape storage. The term VSV is to be interpreted such that a virtual volume is presented as a storage type that is different from the actual storage devices 34a-34n to backup application 23 or other modules. The application sends an input/output request based on the VSV type that is presented. For example, if 34a-34n includes flash based and VSV is presented as a hard drive, then the embodiments disclosed herein will apply. In this example, backup application 23 would send an I/O request for a hard drive while the actual storage is flash based.

The generic term volume as used herein means a logical data set which is an abstraction of physical storage, combining one or more physical mass storage devices or parts thereof into a single logical storage object. However, each volume can represent the storage space in one storage device, an aggregate of some or all of the storage space in multiple storage devices, a RAID group, or any other set of storage space.

In one embodiment, appliance 20 includes an input/output (I/O) interface 33 that is configured to communicate via network 14 using standard protocols, for example, Ethernet, Fibre Channel, Fibre Channel over Ethernet and others. The I/O interface 33 may be configured to handle tape specific I/O requests for accessing storage. The embodiments disclosed herein are not limited to any particular protocol or standard.

Appliance 20 also includes logic 30, which in some embodiments may be embodied in hardware, software or both. Logic 30 may also be referred to as operating system 30 throughout this specification.

In one embodiment, logic 30 includes logic for receiving and storing data via I/O interface 33 and may also include logic for managing the writing, reading, deleting and, in general, management of data at storage devices 34a-34n.

Logic 30 also includes or has access to a processor executable virtual storage module 22 that presents the VSVs 22a-22n to backup application 23 for storing data at storage devices 34a-34n. Each VSV uses a storage unit from among a plurality of storage units 32a-32n within a logical storage space 32 (also referred to as logical space 32) to read and write information to storage devices 34a-34n. A storage unit is a logical storage space that is available to a VSV to store information at storage devices 34a-34n. A storage unit may be of a fixed size, for example, 128 k. In one embodiment, the VSVs 22a-22n are exposed to storage units 32a-32n and are unaware of the physical layout of storage devices 34a-34n.

In one embodiment, storage units 32a-32n of logical space 32 are managed by logic 30. Logical space 32 is a virtual storage space having a plurality of addressable storage units that are presented to the VSVs for storing information at storage devices 34a-34n. A mapping structure 27 maps the storage units 32a-32n to physical storage space at the storage devices 34a-34n. The mapping structure 27 may be maintained by logic 30 or storage sub-system 26. In one embodiment, appliance 20 includes a processor executable, free space module 24 that is used to free storage units' 32a-32n when storage units are not being referenced by any VSV. The term reference as used herein means that a VSV is using a storage unit to store information at a storage device. The free space module 24 ensures that storage units continue to be recycled among VSVs.

In one embodiment, a plurality of VSVs from among 22a-22n may reference a same storage unit. Because multiple VSVs may reference a same storage unit, the process of freeing up the storage units is challenging. One challenge is to ensure that when a storage unit from among 32a-32n is made available to VSVs, it is not being referenced by any other VSV or process. The functionality of free space module 24 to free storage units is described below in more detail.

Figure 1B:
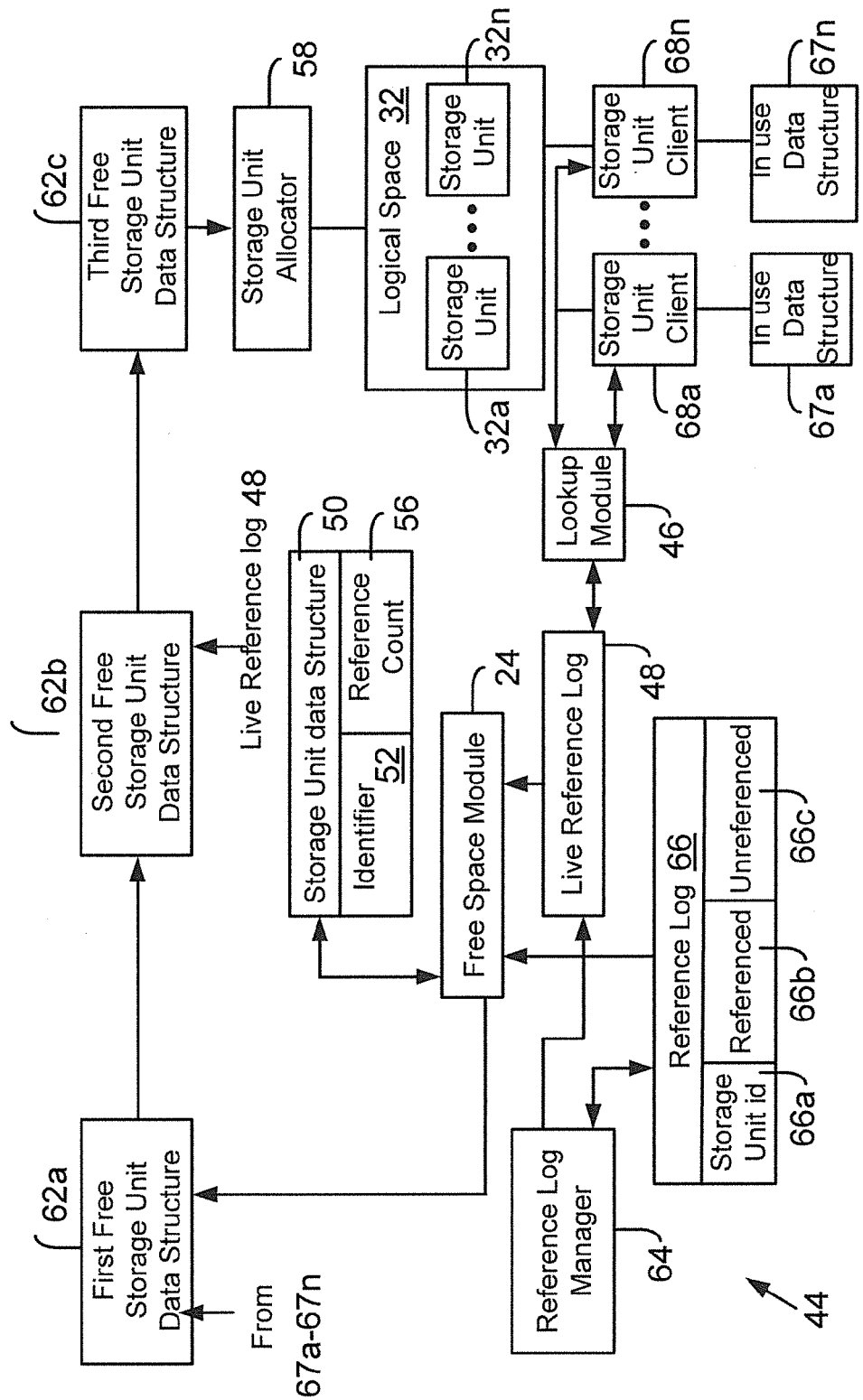
FIG. 1B shows an example of a system for managing storage units, according to one embodiment.

FIG. 1B shows a system 44 that is used to manage the storage units' 32a-32n, according to one embodiment. System 44 may be implemented within logic 30 and includes the free space module 24 that generates a free storage unit data structure 62c (may also be referred to as a third free storage unit log 62c) for identifying storage units that can be allocated to one or more storage unit clients' 68a-68n, as described below in more detail. The term client in this context means a virtual storage volume (for example, 22a-22n as shown in FIG. 1A).

In one embodiment, the storage unit clients' 68a-68n maintain an in-use data structure 67a-67n (may also be referred to as in-use log), respectively. The in-use data structure identifies the storage units that are used by the storage unit client, at any given time.

System 44 includes a processor executable storage allocator 58 that allocates storage units 32a-32n, according to one embodiment. Storage allocator 58 tracks the total number of storage units' 32a-32n in logical space 32 and allocates available storage units to the plurality of clients' 68a-68n.

In one embodiment, storage allocator 58 maintains a storage unit data structure 50 (may also be referred to as data structure 50) that includes a storage unit identifier 52 that identifies a storage unit and a reference count 56. The reference count 56 indicates a number of storage unit clients that may be referencing a particular storage unit at any given time. For example, if there are 5 clients that reference storage unit 32a, then the reference count 56 for storage unit 32a is 5. When a storage unit is not referenced by any client, then the reference count is zero.

As described above, the term reference, as used throughout this disclosure means, using a storage unit. A request to reference a storage unit means a request to use the storage unit.

System 44 also includes a processor executable reference log manager 64 that manages a reference log 66 (may also be referred to as a reference data structure 66) and a live reference log 48 (may also be referred to as a live reference data structure 48), according to one embodiment. When a storage unit is used by one or more storage unit clients' 68a-68n, then the client references the storage unit to indicate that it is using the storage unit. When a client is not using a storage unit, then the storage unit is un-referenced.

In one embodiment, reference log 66 may include fields, 66a, 66b and 66c. Field 66a (storage unit ID field) identifies a storage unit from among 32a-32n, field 66b shows if a storage unit has been referenced and field 66c shows that a storage unit is unreferenced, i.e. a storage unit client is no longer using the storage unit.

The live reference log 48 is used for references that are marked as "live" after a first free storage unit data structure (also referred to as a first free storage unit log) 62a has been generated. The process for generating the first free storage unit data structure 62a and the live reference log 48 is described below in more detail.

Reference log 66 and live reference log 48 are accessible to the free space module 24, according to one embodiment. The details of using the reference log 66 and the live reference log 48 by free space module 24 are provided below with respect to the process flow diagram of FIG. 1C.

In one embodiment, system 44 further includes a processor executable look up service 46 (also referred to as lookup module 46) that is used to free storage units. Details of using the lookup module 46 are also provided below with respect to FIG. 10.

Free space module 24 goes through an iterative process to generate free storage unit data structures 62a-62c. The free storage unit data structure 62c is made available to storage allocator 58. The process of generating the free storage unit data structures 62a-62c will now be described in detail with respect to FIG. 10.

Figures 1, 1C:
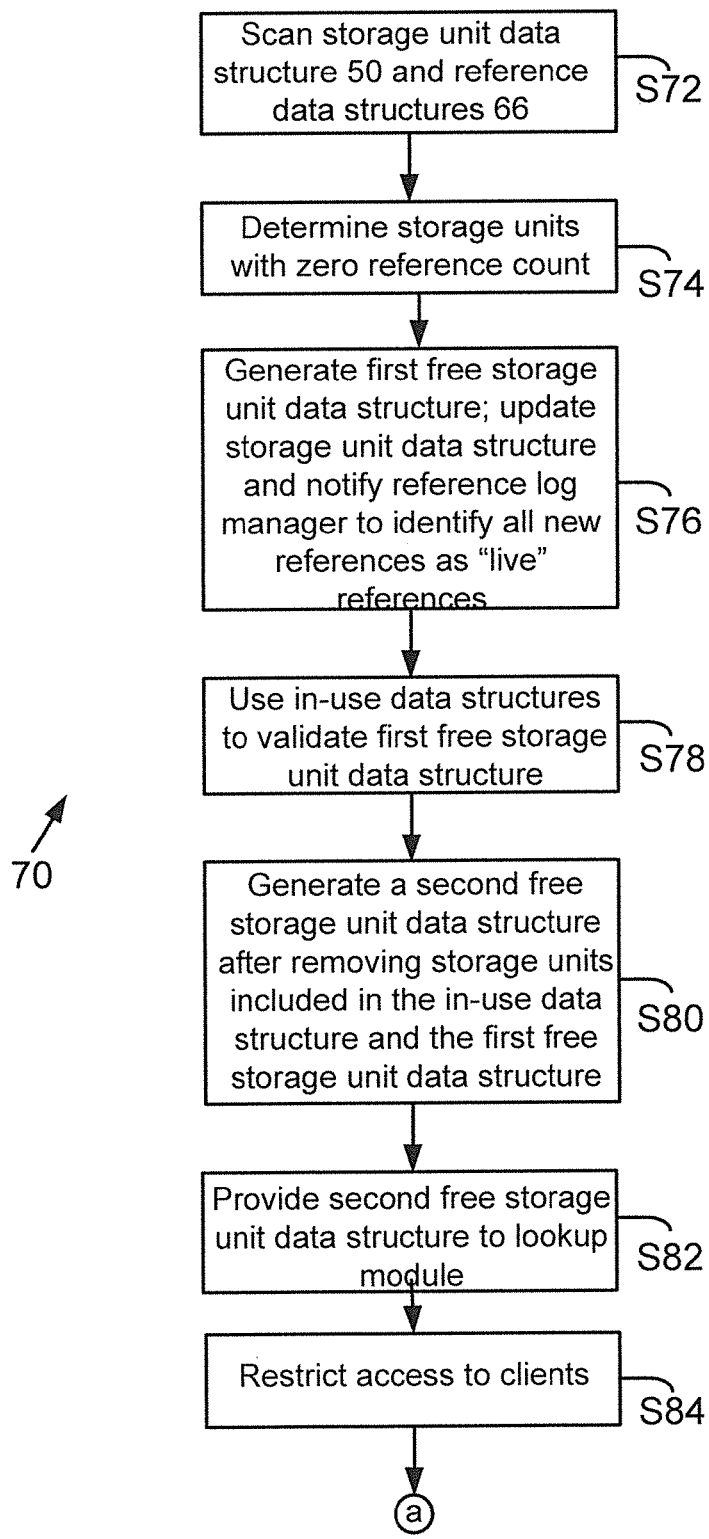
FIG. 1C shows a process flow diagram for managing storage units, according to one embodiment.

Process Flow:

FIG. 1C shows a process 70 for managing the storage units 32a-32n and generating the third free storage unit data structure 62c, according to one embodiment. The third free storage unit data structure 62c is used by storage allocator 58 to allocate storage units to storage unit clients' 68a-68n.

The process begins in block S72 when, in one embodiment, the free space module 24 scans the storage unit data structure 50 and the reference log 66. In block S74, based on the scan, free space module 24 determines which storage units have a reference count of zero and which may have a reference count greater than zero. When a storage unit has a reference count of zero, it means that the storage unit is not being used by any storage unit client 68a-68n. When a reference count is greater than zero it means that at least one storage unit client is referencing the storage unit. In one embodiment, this information is obtained from fields 52 and 56 of data structure 50 and fields 66a, 66b and 66c of reference log 66 during the scan of block S72.

In block S76, the free space module 24 generates a first free storage unit data structure 62a, according to one embodiment. The first free storage unit data structure 62a is an intermediate data structure providing an interim list of free storage units from among 32a-32n.

After generating the first free storage unit data structure 62a, free space module 24 updates the storage unit data structure 50. The reference log manager 64 is notified to log any new references to a storage unit after the first free storage unit data structure 62a is generated as live references. These live references are shown as the live reference log 48 in FIG. 1B. In another embodiment, the live reference entries may be a part of the reference log 66 and are simply marked as "live", which means that they have not been processed yet since the first free storage unit data structure 62a was generated.

In block S78, the free space module 24 validates the entries in the first free storage unit data structure 62a. In one embodiment, the free space module 24 performs this task by verifying that the entries in the first free storage unit data structure 62a have a reference count of zero. Free space module 24 performs this task by comparing the entries of in-use data structures 67a-67n and the entries in the first free storage unit data structure 62a. Block S78 is a filtering process for removing any entries from the first free storage unit data structure 62a that may also be included in data structures 67a-67n.

If any storage unit in the first free storage unit data structure 62a is included in any of the in-use data structures, then the storage unit is removed from the first free storage unit data structure 62a. Thereafter, the free space module 24 generates a second free storage unit data structure 62b in block S80. The second free storage unit data structure 62b is also an intermediate data structure.

In block S82, the second free storage unit data structure 62b is made available to lookup module 46 (FIG. 1B). The second free storage unit data structure 62b is made available to lookup module 46 so that it can verify that a storage unit that is being requested by a storage unit client is not included in the second free storage unit data structure 62b.

In block S84, access to storage unit clients 68a-68n is restricted by free space module 24. The live references from the live reference data structure 48 are also collected in block S86. The storage unit clients 68a-68n are notified in block S88 to use the lookup module 46 before they log (or record) any new references to a storage unit. This is to ensure that a storage unit that is being freed and is included in the second free storage unit data structure 62b is not being referenced or requested by a storage unit client.

In block S90, the live reference log 48 and the second free storage unit data structure 62b are input to free space module 24. The live reference log 48 includes the entries that may have been referenced since block S78. If the live reference log 48 includes any entries that are also in the second free storage unit data structure 62b, then those entries are removed from the second free storage unit data structure in block S90. Based on the filtering in block S90, the third free storage unit data structure 62c is generated in block S92. Any reference to storage units in the third free storage unit data structure 62c is removed from any other data structure (not shown) that is used or maintained by logic 30 or any other module. This ensures that the storage units in the third free storage unit data structure 62c can be allocated.

In block S94, the lookup service provided by lookup module 46 is terminated and storage unit clients' 68a-68n are notified not to use the lookup module 46 when requesting a storage unit. Thereafter, in block S96, the third free storage unit data structure is made available to storage allocator 58 so that storage units can be allocated to storage clients 68a-68n.

Figures 1, 1C, 2:
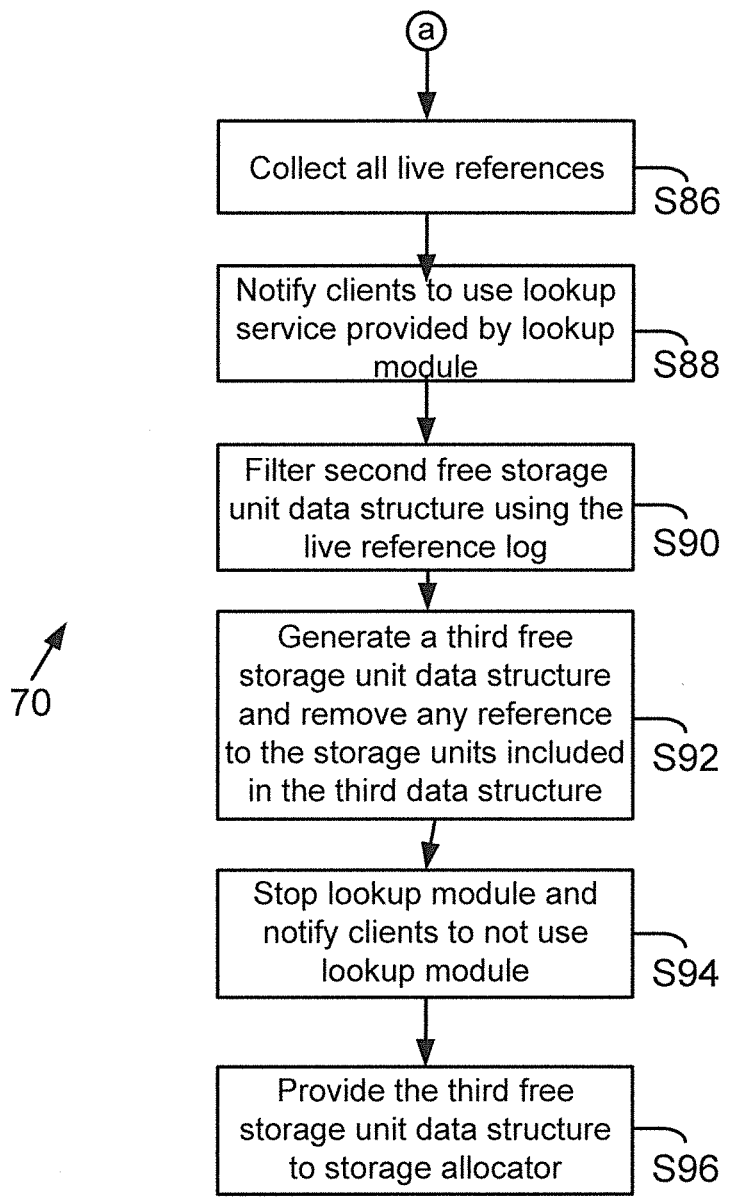
FIG. 2 shows an example of a timeline for creating intermediate data structures and a data structure for identifying free storage units, according to one embodiment.
Figures 1, 1D, 2:
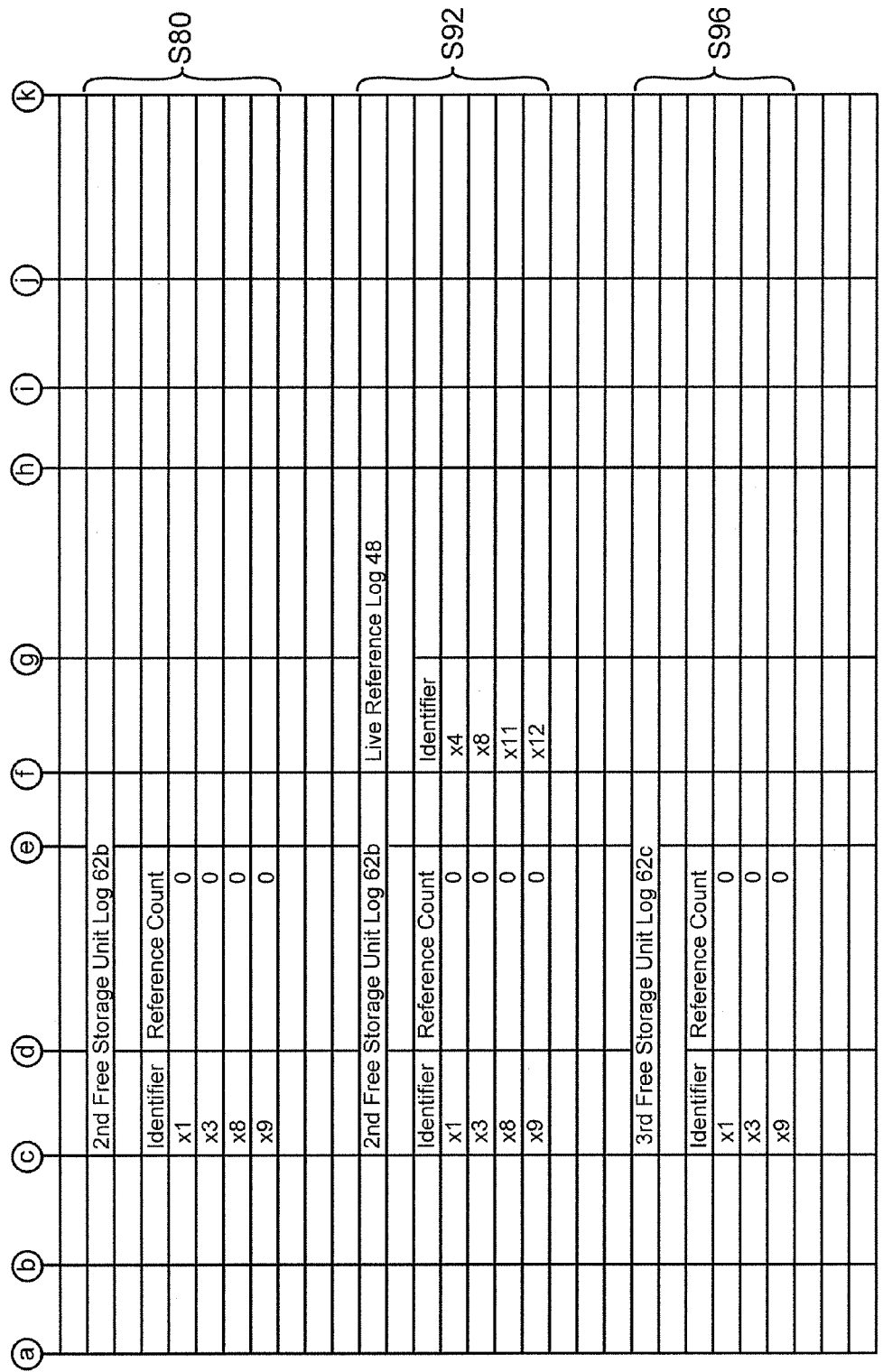
FIG. 1D shows an example of creating a data structure for identifying free space, according to one embodiment.
Figure 2:
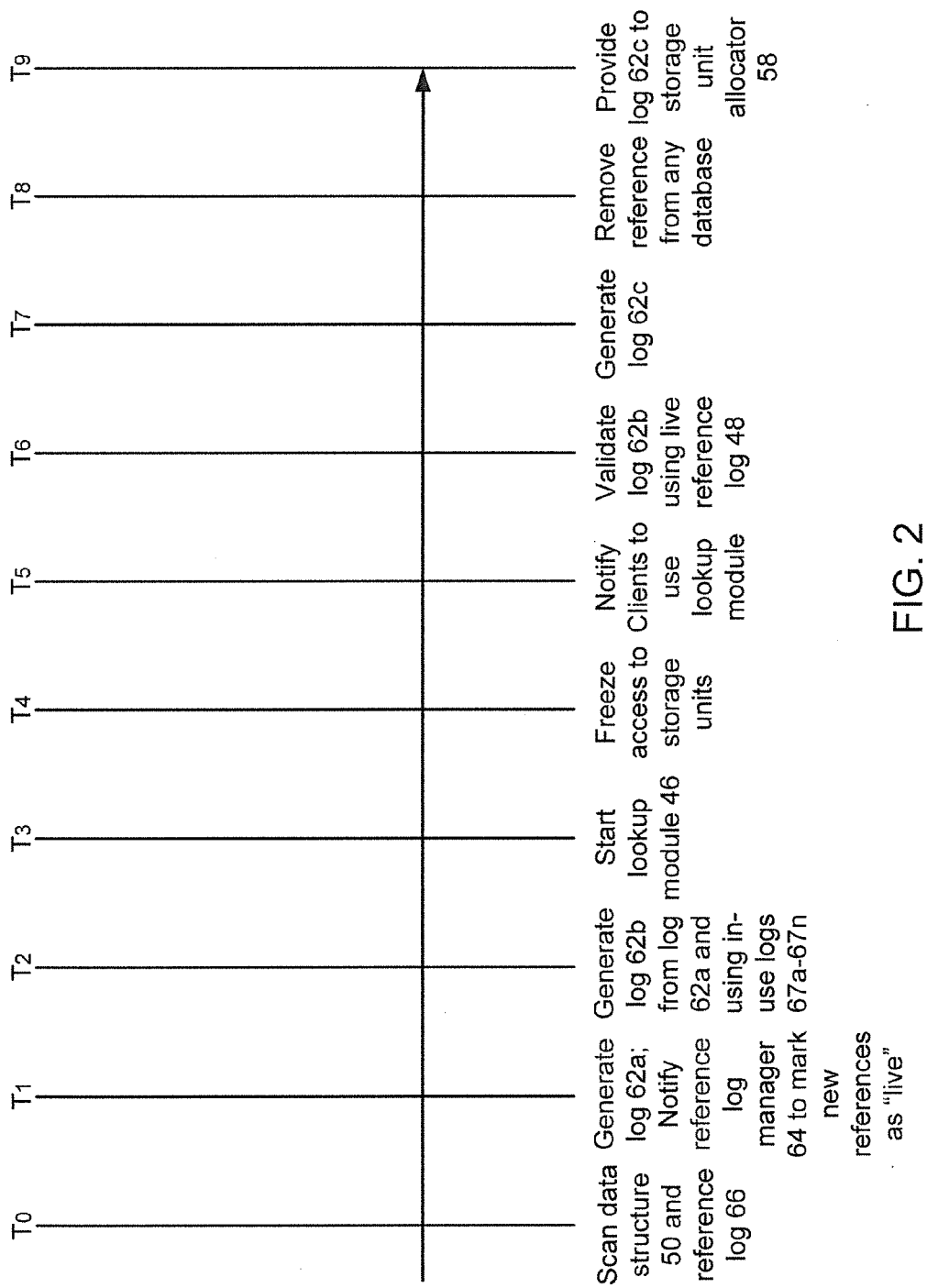

FIG. 1D provides an example of generating the first free storage unit data structure 62a, the second free storage unit data structure 62b and the third free storage unit data structure 62c using the process 70 described above with respect to FIG. 1C, in one embodiment.

Block S72 shows the data structure 50 with storage units x1-x10. The reference logs 66 are shown as reference log 1-reference log n. The free space module 24 scans data structure 50 and the reference logs 66 in block S72.

Based on the scan, in block S76, data structure 50 is updated and includes storage units x2, x4, x6 and x7. The first free storage unit data structure 62a includes storage units x1, x3, x8, x9 and x10.

In block S78, the first free storage unit data structure 62a is compared against the in-use data structures 67a-67n. Based on the comparison, x10 that is referenced in data structure 67n is removed from the first free storage unit data structure 62a. The second free storage unit data structure 62b is generated in block S80 and includes storage units x1, x3, x8 and x9.

In block S92, the second storage unit data structure 62b is compared to the live reference log 48 that includes storage units x4, x8, x11 and x12. Based on the comparison, the third free storage unit data structure 62c is generated in block S96 and includes x1, x3 and x9 because storage unit x8 is included in the live reference log 48 and removed from the second free storage unit data structure 62b.

It is noteworthy that although the process flow of FIG. 1C and the example of FIG. 1D show two intermediate data structures (62a-62b), the embodiments disclosed herein are not limited to the two data structures. In one embodiment, a single intermediate data structure may be used to generate data structure 62c. In another embodiment, more than two data structures may be used to generate data structure 62c.

FIG. 2 shows a timeline, T0-T9 for managing storage space, according to one embodiment. The timeline is based on the process steps of FIG. 1C and the system of FIG. 1B that have been described above.

At time T0, storage unit data structure 50 and the reference log 66 are scanned. Based on the scan, at time T1, the first free storage unit data structure 62a is generated. The reference log manager 64 is notified to log new references as live references.

At time T2 the second free storage data structure 62b is generated by removing references from storage unit data structure 62a that are included in the in-use data structures 67a-67n.

At time T3, the lookup module 46 is started. At time T4, access to the storage units is restricted and the live reference log 48 is provided to free space module 24. At time T5, the storage unit clients 68a-68n are notified to use the lookup module 48.

At time T6, the second free storage unit data structure 62b is validated against the live reference log 48 and then the third free storage unit data structure 62C is generated at time T7. The term validation as used herein means that the second free storage unit data structures 62b is compared with the live reference log 48 to remove any entries from the second free storage unit data structure 62b that may also be included in the live reference log 48.

At time T8, reference to any of the storage units in the third free storage unit data structure 66c from any other data structure is removed. At time T9, the third free storage unit data structure 62c is made available to storage unit allocator 58 so that the storage units included in the third free storage unit data structure 62c can be allocated to any storage unit client 68a-68n.

It is noteworthy that the foregoing timeline is shown as an example of the adaptive embodiments. The timeline is not to limit the embodiments disclosed herein to any specific sequence of events because some events may occur simultaneously.

In one embodiment, a machine implemented method for releasing storage units 32a-32n within logical space 32 is provided. The method includes receiving a request to reference a storage unit from a storage unit client 68a-68n; verifying if the storage unit is included in an intermediate data structure (for example, 62a and 62b) identifying storage units that are not referenced by a storage unit client. The method further includes removing the storage unit from the intermediate data structure if the storage unit is included in the intermediate data structure; and generating a data structure (62c) identifying a plurality of storage units that are not referenced by any client and are made available for allocation to storage unit allocator 58.

The embodiments disclosed herein have numerous advantages. For example, the systems and processes generate a data structure identifying storage units that can be allocated. The data structure is verified at different stages to ensure that any storage unit in the data structure is not being used by any virtual storage volume. Because storage units are allocated accurately, one can rely on the allocation for safely storing information.

Figure 3:
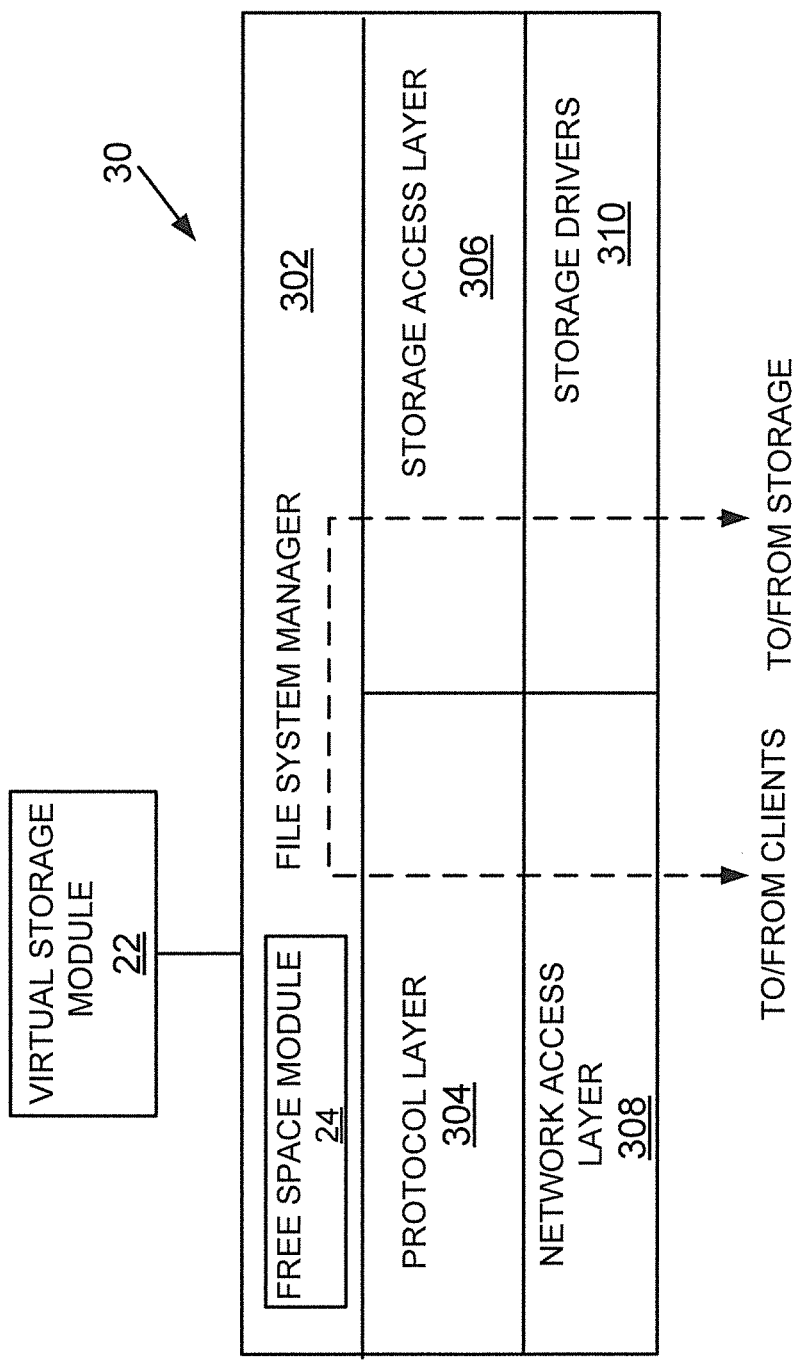
FIG. 3 shows an example of an operating system used according to one embodiment.

FIG. 3 illustrates a generic example of logic 30 that is also referred to as operating system 30 (or storage operating system 30), according to one embodiment of the present disclosure. In one example, operating system 30 may include several modules, or "layers". These layers include a file system manager 302 that keeps track of a directory structure (hierarchy) of the data stored in storage devices and manages read/write operations, i.e., executes read/write operations on disks.

File system manager 302 may include or interface with the free space module 24 and the various components of system 24 that have been described above in detail with respect to FIGS. 1B and 1C. In one embodiment, file system 302 interfaces with the virtual storage module 22 described above and shown in FIG. 1A. In another embodiment, the virtual storage module 22 may be integrated with the file system 302. The embodiments disclosed herein are not limited to the location of virtual storage module 22, free space module 24 or any other component.

Operating system 30 may also include a protocol layer 304 and an associated network access layer 308, to allow appliance 20 to communicate over a network with other systems, such as backup application 23, storage system 21, user systems 12 and management application 18. Protocol layer 304 may implement one or more of various higher-level network protocols, such as Hypertext Transfer Protocol (HTTP), TCP/IP and others, as described below.

Network access layer 308 may include one or more drivers, which implement one or more lower-level protocols to communicate over the network, such as Ethernet. Interactions between user systems 12 and mass storage devices 34a-34n are illustrated schematically as a path, which illustrates the flow of data through operating system 30.

The operating system 30 may also include a storage access layer 306 and an associated storage driver layer 310 to communicate with a storage device, for example, 34a-34n. The storage access layer 306 may implement a higher-level disk storage protocol, such as RAID (redundant array of inexpensive disks), while the storage driver layer 310 may implement a lower-level storage device access protocol, such as SCSI.

It should be noted that the software "path" through the operating system layers described above may alternatively be implemented in hardware or a combination of hardware and software. That is, in an alternate embodiment of the disclosure, the storage access request data path may be implemented as logic circuitry embodied within a field programmable gate array (FPGA) or an ASIC.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
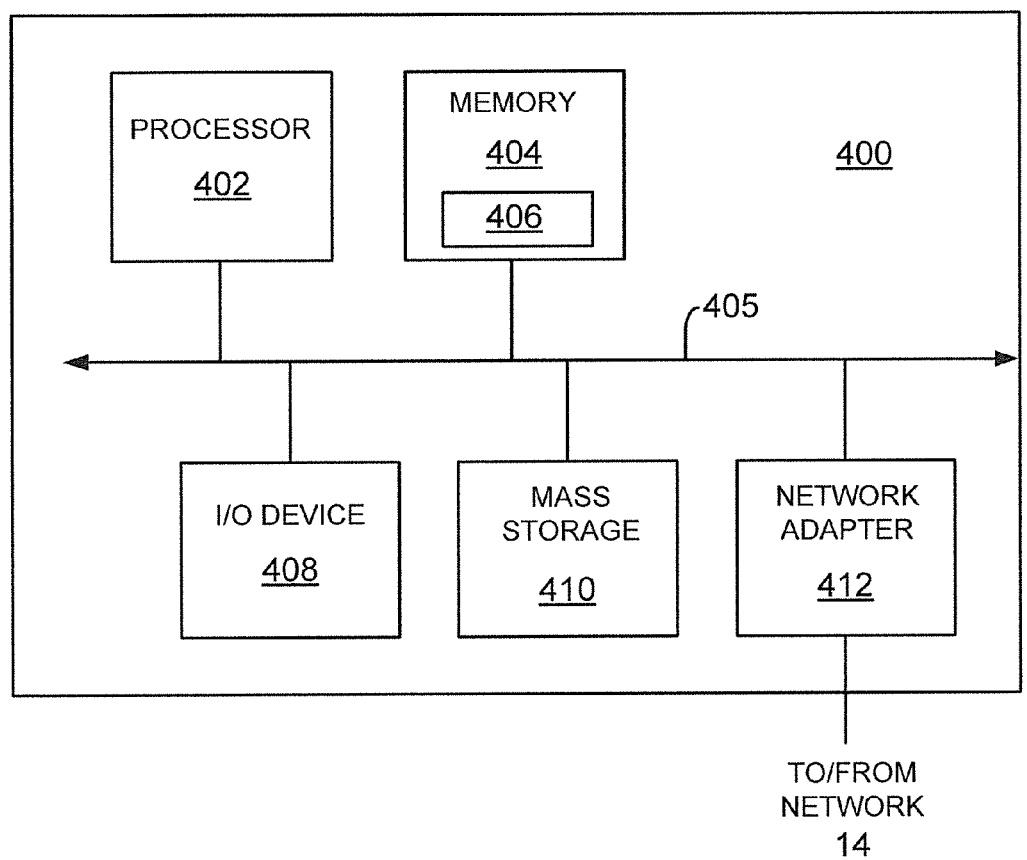
FIG. 4 shows a block diagram of a computing system for implementing the adaptive process of the present disclosure.

Processing System:

FIG. 4 is a high-level block diagram showing an example of the architecture of a processing system, at a high level, in which executable instructions for free space module 24 and the various components of system 44 as described above, can be implemented. The processing system 400 can represent appliance 20, storage system 21, a console executing backup application 23, management console 18, user systems 12 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements the process steps of FIG. 1C may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20) over a network and may be, for example, an Ethernet adapter, a Fibre Channel adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments.

The storage systems and appliance 20 described above can be a part of the server layer for providing storage services. Free space module 24 and the various components of system 44 may be executed at any system that is coupled to the cloud.

Thus, a method and apparatus for managing logical space is provided. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A system, comprising:
a memory having machine readable medium comprising machine executable code having stored thereon instructions; and a processor module coupled to the memory, the processor module configured to execute the machine executable code for generating a first data structure for identifying a set of storage units that are not referenced by any storage unit client, where a storage unit is a logical storage space made available to a virtual storage volume (VSV) that is provided to a storage unit client for storing information at a storage device; wherein a plurality of VSV reference a same storage unit; generating a second data structure after verifying that the storage units identified by the first data structure are not referenced by any storage unit client; wherein the second data structure is generated from the first data structure after filtering out any entry associated with a storage unit that may have been referenced by any storage unit client after the first data structure is generated; and before referencing a storage unit, using the second data structure to determine if any storage unit client request is for a storage unit identified by the second data structure.

2. The system of claim 1, wherein any storage unit that is referenced since the second data structure is generated is removed from the second data structure.

3. The system of claim 2, wherein a third data structure is generated for identifying storage units that are not referenced by any storage unit client and are ready for allocation.

4. The system of claim 3, wherein the third data structure is presented to a processor executable storage allocator that allocates storage units identified by the third data structure.

5. The system of claim 1, wherein the storage unit clients are presented by a device.

6. The system of claim 1, wherein the first data structure is generated by using a storage unit data structure that stores information identifying each storage unit and a reference count indicating a number of storage unit clients that reference each storage unit; and a reference data structure that identifies each storage unit with an indicator indicating whether a storage unit is referenced or unreferenced.

7. The system of claim 6, wherein the reference data structure is maintained by a processor executable reference log manager.

8. The system of claim 7, wherein the reference log manager identifies all new references as a live reference in a live reference data structure after the first data structure is generated.

9. The system of claim 8, wherein the live reference log verifies if the storage units in the second data structure are not referenced by any storage unit client before a third data structure is generated.

10. A system, comprising:
a memory having machine readable medium comprising machine executable code having stored thereon instructions; and a processor module coupled to the memory, the processor module configured to execute the machine executable code for generating an intermediate data structure identifying storage units that are not referenced by any storage unit client from among a plurality of storage unit clients for storing information at a storage device; wherein a storage unit is a logical storage space made available to a virtual storage volume (VSV) provided to a storage unit client for storing information at the storage device and a plurality of VSV reference a same storage unit; providing a live reference data structure identifying any storage unit that is referenced by any storage unit client after the intermediate data structure is generated; and generating a data structure after removing any storage unit that is identified by the intermediate data structure and also included in the live reference data structure; wherein the data structure identifies storage units that are not referenced by any storage unit client and are ready for allocation.

11. The system of claim 10, wherein the machine executable code scans a storage unit data structure and a reference data structure for generating the intermediate data structure.

12. The system of claim 11, wherein the storage unit data structure identifies a storage unit and provides a reference count indicating a number of storage unit clients that reference the storage unit.

13. A non-transitory, machine readable storage medium having stored thereon instructions for performing a method, comprising machine executable code which when executed by at least one machine, causes the machine to:
generate a first data structure for identifying a set of storage units that are not referenced by any storage unit client, where a storage unit is a logical storage space made available to a virtual storage volume (VSV) that is provided to a storage unit client for storing information at a storage device; wherein a plurality of VSV reference a same storage unit;
generate a second data structure after verifying that the storage units identified by the first data structure are not referenced by any storage unit client; wherein the second data structure is generated from the first data structure after filtering out any entry associated with a storage unit that may have been referenced by any storage unit client after the first data structure is generated; and before referencing a storage unit, use the second data structure to determine if any storage unit client request is for a storage unit identified by the second data structure.

14. The storage medium of claim 13, wherein any storage unit that is referenced since the second data structure is generated is removed from the second data structure.

15. The storage medium of claim 14, wherein a third data structure is generated for identifying storage units that are not referenced by any storage unit client and are ready for allocation.

16. The storage medium of claim 15, wherein the third data structure is presented to a processor executable storage allocator that allocates storage units identified by the third data structure.

17. The storage medium of claim 13, wherein the first data structure is generated by using a storage unit data structure that stores information identifying each storage unit and a reference count indicating a number of storage unit clients that reference each storage unit; and a reference data structure that identifies each storage unit with an indicator indicating whether a storage unit is referenced or unreferenced.

18. The storage medium of claim 17, wherein a reference log manager identifies all new references as a live reference in a live reference data structure after the first data structure is generated.

19. The storage medium of claim 18, wherein the live reference data structure is used to verify if the storage units in the second data structure are not referenced by any storage unit client before a third data structure is generated.

* * * * *